United States Patent [19]
Zeiner-Gundersen

[11] Patent Number: 5,810,048
[45] Date of Patent: Sep. 22, 1998

[54] METAL FACE SEALING COUPLING

[76] Inventor: Dag H. Zeiner-Gundersen, P.O. Box 46301, Houston, Tex. 77056

[21] Appl. No.: 697,263

[22] Filed: Aug. 21, 1996

[51] Int. Cl.$^6$ .................................................. E03B 65/20
[52] U.S. Cl. ............................... 137/614.04; 251/355.3; 251/149.7
[58] Field of Search ................... 137/614.04, 614.03; 251/335.3, 149.7

[56] References Cited

U.S. PATENT DOCUMENTS

| | | | |
|---|---|---|---|
| 4,373,551 | 2/1983 | Shindelar . | |
| 4,452,462 | 6/1984 | Karr . | |
| 4,502,662 | 3/1985 | Maldavs et al. | 137/614.04 |
| 4,561,465 | 12/1985 | Rogers | 137/614.04 |
| 4,582,295 | 4/1986 | Kugler et al. . | |
| 4,694,859 | 9/1987 | Smith . | |
| 4,709,726 | 12/1987 | Fitzgibbons | 137/614.04 |
| 4,768,538 | 9/1988 | Mintz et al. . | |
| 5,343,891 | 9/1994 | Bosley . | |
| 5,355,909 | 10/1994 | Smith, III | 137/614.04 |
| 5,479,960 | 1/1996 | Kirkman . | |

FOREIGN PATENT DOCUMENTS

| | | | |
|---|---|---|---|
| 0076731 | 6/1977 | Japan | 137/614.04 |

Primary Examiner—Denise L. Ferensic
Assistant Examiner—John Ball
Attorney, Agent, or Firm—Russell J. Egan

[57] ABSTRACT

A metal face sealing coupler providing high elasticity and/or spring back to maintain effective annular sealing between male and female coupling members while allowing and lateral movement for make up of the two coupling members. The female member has a main body with an internal poppet valve and a metal face seal with high deflection and spring back capability, generally an E-ring. An outer shell is attached to the main body and provides lateral support for the metal sealing element, lateral guidance and vertical connection to a support ring and lateral guidance and indexing of the female member during make up with the male member. The support ring allows the main body a limited lateral movement when the female member makes up with the male member. The female member fits inside the outer shell. The male member, with an internal poppet valve, engages the metal face sealing element, which flexes and allows for sealing in any position within a pre defined longitudinal tolerance envelope. The metal sealing element is plastically and elastically deformed to the proper relative position between the male and female members and has a revocable significant elastic spring back when the male and female members are parted which allows the connection to be made up repeatedly with the same seal.

17 Claims, 5 Drawing Sheets

METAL FACE SEALING COUPLING

BACKGROUND OF THE INVENTION

1. Field of the Invention

The present invention relates to couplings used in control and fluid connections, typically for subsea applications. The subject coupling is primarily for use when high elasticity, manufacturing tolerance and/or significant spring back is needed to maintain effective sealing of the coupling. The invention also allows for a relatively high lateral and axial alignment movement between the male and female coupler members while maintaining proper sealed mating.

2. Related Art

Hydraulic and fluid couplings generally consist of male and female members with resilient (nonmetal) or metal seals positioned in the female member forming a seal when the male member is probed into to the female member. The female member is generally a cylindrical body with a larger diameter bore on one end and a smaller bore on the other end profiled for connection to hydraulic manifolds, tubing or fluid carrying pipe or the like. The larger diameter bore contains a resilient seal and/or metal axial seal and receives the male member of the coupling.

The male member also has one end profiled for connection to hydraulic manifolds, tubing or fluid carrying pipe or the like and has a cylindrical portion on the other end with a diameter less than that of the larger bore of the female member. When the cylindrical portion of male member is inserted into the larger bore of the female member, the resilient or metal axial seal, such as O-rings, engage the male member about its circumference. The fluid is free to flow through the female and male members of the mated coupling and the various seals prevent that flow from escaping about the joints in the coupling.

A check valve, with or without an integrated pressure relief means, is installed in at least one of the male or female coupler members. Each check valve is opened when the coupling is made up; and closes when the coupling is uncoupled so as to prevent fluid from leaking out of the system through the unmated coupling members. When a pressure relief means, preferably a reversing check valve, is integrated into the check valve in the coupling, a small amount of fluid will seep out of the unmated coupling members in order to prevent hydraulic blocking of hydraulic cylinders.

Several types of seals are currently being used in known couplings. Resilient (non-metal) seals have disadvantages in their inability to efficiently withstand the deteriorating effects from dry or wet environments and exposure to chemicals for extended periods of time, and their inability to contain high to ultra high system pressures for sustained periods.

Metal seals are available which better resist the deteriorating effects of dry or wet environments, exposure to chemicals, and high to ultra high pressures. However, these metal seals have their own disadvantages in applications requiring repeated coupling and uncoupling, without replacing the sealing element, and/or applications requiring high seal deflection or dynamic sealing when spring back is needed to maintain effective sealing. These metal seals further require high manufacturing tolerances.

A compression-type seal is generally positioned between the mating ends of the male and the female members of the coupling. When the male member is inserted in the female member, the seal is compressed between the two members and an effective seal is established between the two. In view of the compression action, metal seals generally have low life, in that they can only be used once, have no dynamic capability, and often require replacement prior to each mating of the coupling. The seal is placed in an annular groove in the interior of the bore in the female member or it rests at the interior end of that bore for engagement with the end of the male member. There generally is no mechanism for retention of the seal in the uncoupled female member. If the coupling is uncoupled while under pressure, the seal generally blows out of the female member.

Metal axial seals with O-, J-, V-, or C-seal configurations engage the male member about its circumference. The seal is retained in the female bore by some clips or a cylinder supported by some clips. When the male member is inserted into the female member, the male member slides against the seal until it is in position and a sealing engagement is affected between the two. In view of the relative sliding action, the seal and the applied coating, generally silver, wear off so that the seal may have a very limited life. Seals of the O-, J-, V-, or C-configurations also generally have a very limited spring back, making them less tolerable to eccentric inserting of the male member, and require high manufacturing tolerances. The relative sliding action between the metal seal and the male member often causes galling of the latter due to material incomparability and/or the presence of foreign particles in the fluid or in the surrounding wet or dry environment in general.

A face to face sealing of coupler members uses a metal facing C-Seal placed in a groove and retained in position by a retainer device or clips. When the coupling is made up, the female and the male members have a face to face engagement. The seal protrudes a very small distance from the face of the female member. The male member's engagement with the female member will deform and deflect the seal. Since a face seal has limited capability for deflecting, the male member and the female member must engage completely with substantially parallel faces in order to achieve an absolute seal between the members. Tolerances between supporting structures or individual couplings mounted in parallel in a support structure must be compensated by the use of springs, which are exposed to the full separation forces of the coupling, or by shimming, which is often unreliable and unpractical in use. Typically a spring will be used which may, when high pressure or pressure spikes occur in a fluid system, allow the face to face metal seal to move apart, and, due to the very limited spring back capability of the seal, relieve small amounts of pressurized fluid to the environment. A face to face miniature coupling without lateral guidance will also require very accurate positioning of the female coupling member and seal in order to index the seal properly and engage the seal surface on the male member. In view of a requirement for the fine vertical and lateral alignment, some couplings use a design configuration requiring higher machining and/or operational tolerances and will often leak and/or be subject to mechanical damage. A requirement for this coupler to be used in a pressure balanced application will require a preloaded locking device.

SUMMARY OF THE INVENTION

The present invention overcomes the above-mentioned disadvantages by providing a coupling where the female member retains a seal with high longitudinal flexibility and spring back for greater longevity of the seal. The seal is retained by an axial flange in the main body, which flange has two parallel flat faces facilitating insertion of the seal into position and maintaining the seal in position when the coupling is unmated. An outer shell laterally supports the seal and provides lateral guidance and longitudinal support for a support ring of the female member. The available lateral movement between the support ring and the main body will allow a relative lateral movement between the female and the male member to compensate for imperfect location in, for example, a support manifold structure and provide perfect indexing between the male and the female members. The outer shell will act as receiving socket while the male member is mated with the female member engaging the seal. The support ring allows the main body a limited lateral movement when the female member makes up with the male member. Due to the close proximity of the seals to the longitudinal axis of the coupling, and assuming normal manufacturing tolerances, the subject coupler has a higher tolerance to angular misalignment, typically up to 5°, than was previously possible. The metal sealing element is deformed to the proper relative position between the male and female member but will additionally have a significant spring back which allows the connection to be made up repeatedly with the same seal. The metal face seal also becomes a dynamic seal for relative lateral or angular movements during operation. The present seal will not be subjected to slide on any surface thus eliminating excessive wear, galling or permanent deformation generally caused by such sliding actions and/or due to material incompatibility. A secondary seal, preferably an axial helical spring activated elastomeric seal, will be located in an axial groove in the female member which will allow the present metal face seal to disengage from the seal surface while unmating the coupling without being exposed to full differential pressure. This will prevent the seal from being exposed to high pressure shock loads and hydraulic locks and eliminate excessive wear and/or permanent deformation.

For electrical connector applications, typically for sensor applications, non dielectric fluid is used and the mutually engaging poppet members are of non dielectric material while the ends of the poppets have electrical contact inserts connected to insulated wires passing through the poppet member. The metal face seal, typically an E-seal, and all metal seal surfaces used for the electrical circuit are preferably gold plated for corrosion protection and extended life.

For fiber optic connector applications, typically for sensor applications, the mutually engaging poppet members have axial bores receiving therein a fiber optic cable while the ends of the poppets have contact surfaces profiled to properly align the optical fibers.

BRIEF DESCRIPTION OF THE DRAWINGS

The present invention will now be described, by way of example, with reference to the accompanying drawings, in which:

FIG. 1 is a longitudinal section through an assembled coupling of the present invention schematically showing the male and female members of the coupling connected between a multi coupler holder, manifold, support structure, or the like;

DETAILED DESCRIPTION OF A PREFERRED EMBODIMENT

Figure 1:
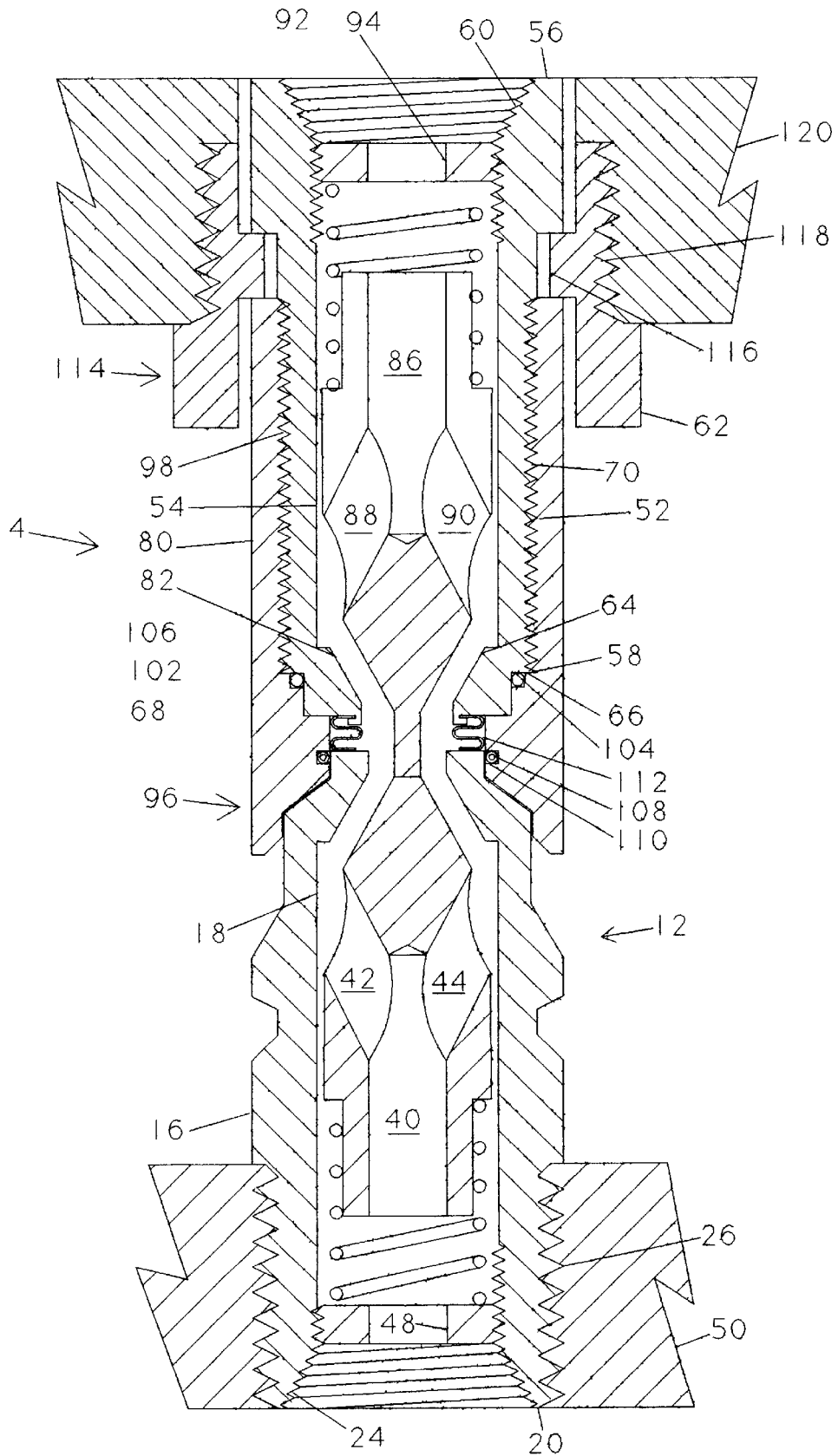

The male coupler member 12 (FIGS. 1 and 2) and the female coupler member 14 (FIGS. 1 and 3) are intended for axially aligned mated engagement to form the coupling 10 shown in FIG. 1. In a typical fluid connection application, a plurality of these couplings, each comprising male and female coupler members, each connect respective lines of the fluid, such as hydraulic, system. The mated couplers interconnect the respective fluid lines without loss of fluid or of the fluid pressure which is being transmitted through the respective lines and further seals lines preventing the external environment from transmitting gases or fluids into the system. Mating of the coupling members engage spring loaded poppet valve members in each coupler member so that a small amount of fluid is released into the annular cavity between the members displacing any fluids or gases therein. Little, if any, of the system fluid will be released to the surrounding environment during coupling or uncoupling. The spring loaded poppet valve member of the male coupler member may incorporate a pressure relief means, typically a reverse acting check valve, to avoid hydro locking of functions connected through fluid lines to the male coupler member.

Figure 2:
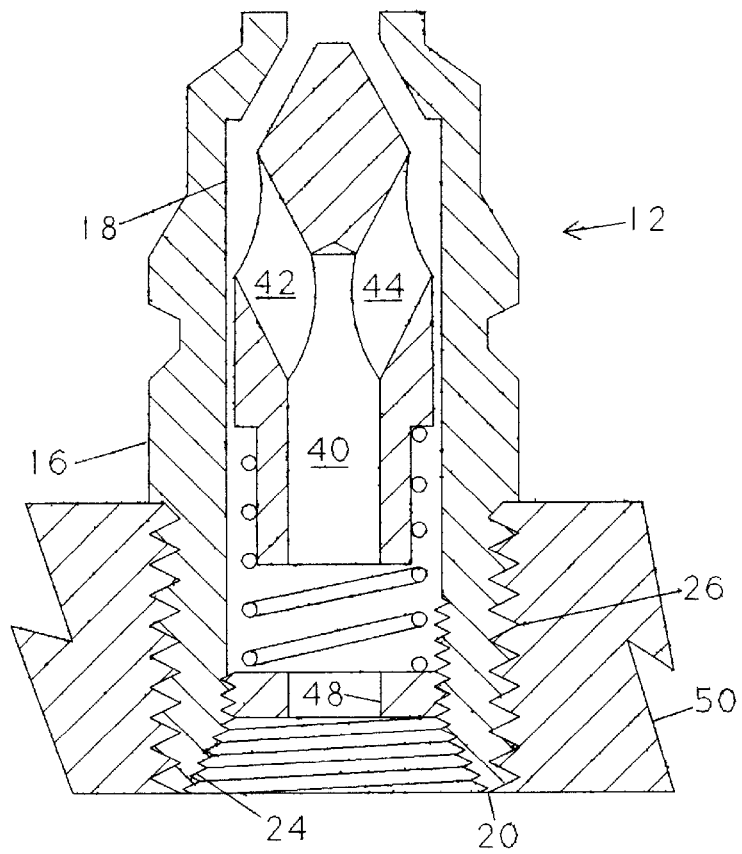
FIG. 2 is a longitudinal section through the male member of the subject coupler in an uncoupled condition.

Referring to FIG. 2, the male coupler member 12 has a cylindrical housing 16 with a profiled internal axial bore 18 extending from a mounting end 20 to a mating end 22. The mounting end of the housing is provided with internal threads 24 and external threads 26. The mating end of the axial bore 18 has a conical sealing face 28. The outer surface of the mating end 22 of the housing 16 has concentric stepped shoulders 30, 32. A poppet member 34 is mounted in the bore 18 with a conical sealing face 36 adapted to engage the sealing face 28 and tip 38 projecting through bore 18 beyond shoulder 32. The poppet member 34 has an internal axial bore 40 and radial bores 42, 44 allowing fluid flow when the sealing surfaces 28,36 are disengaged (see FIG. 1). Spring means 46, typically a helical or wave spring, is supported in the bore by retainer 48 engaging internal threads 24 to bias the poppet member 34 to the position shown in FIG. 2. External threads 26 provide for assembly of the male coupler member with fluid distribution means 50, such as tubing, a manifold or the like.

Figure 3:
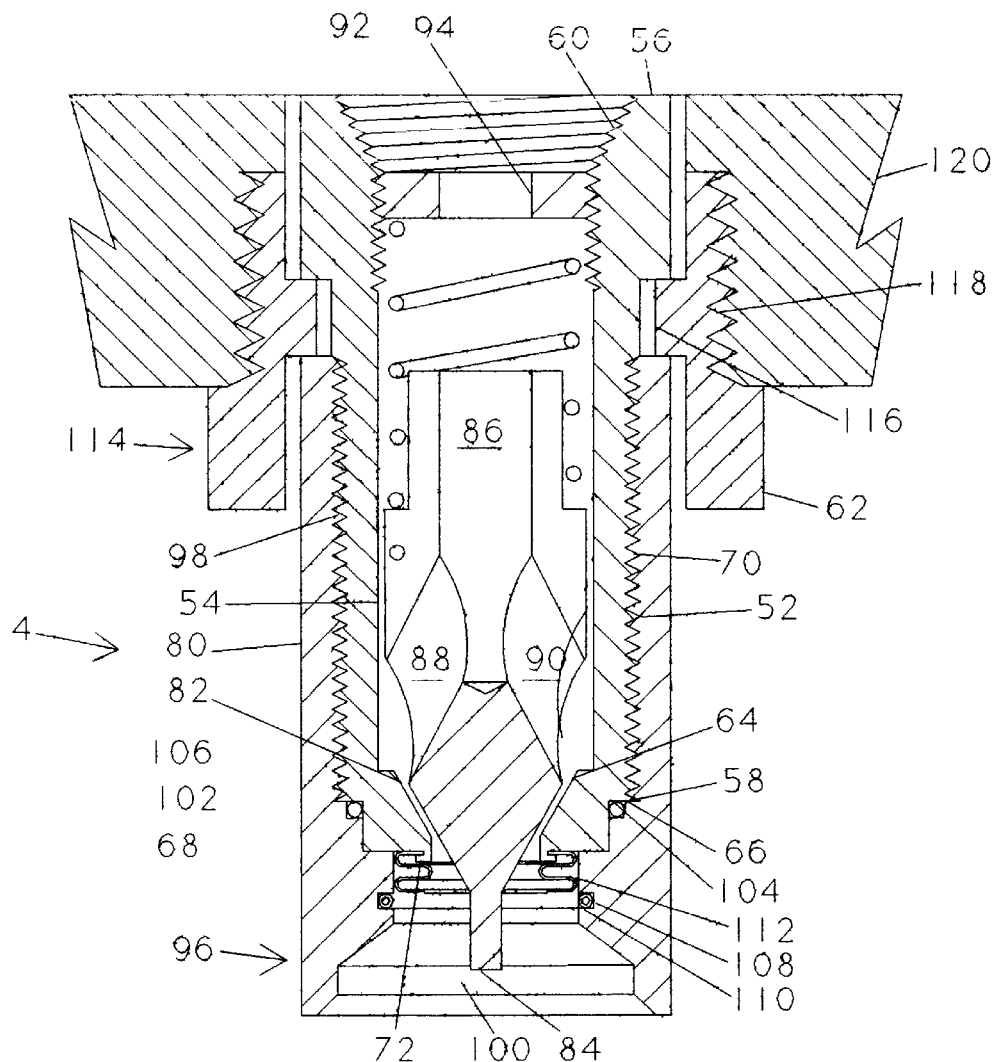
FIG. 3 is a longitudinal section through the female member of the subject coupler in an uncoupled condition.
Figure 4A:
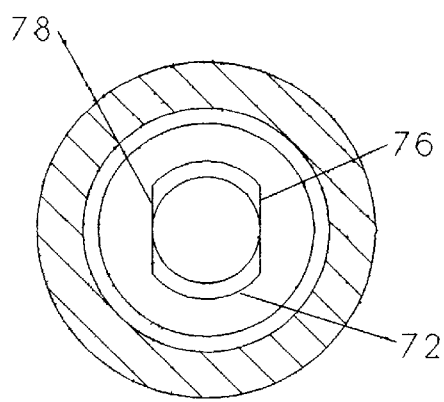
FIG. 4A is a detail plan view, on an enlarged scale, showing the retention of the E-shaped metal seal in the female member.
Figure 4B:
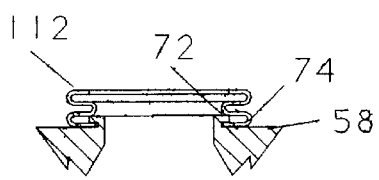
FIG. 4B is a detail longitudinal section, on an enlarged scale, showing the retention of the E-shaped metal seal in the female member.

The female coupler member 14, as shown in FIG. 3, has a main body 52 which has a profiled axial bore 54 extending from a mounting end 56 to a mating end 58. The mounting end of the main body is provided with internal threads 60 and external annular groove 62. The mating end of the axial bore has an internal conical sealing face 64. The outer surface of the mating end 58 of the main body 52 has concentric stepped shoulders 66, 68, and external threads 70. The bore 54, at the mating end 58 is surrounded by a flange 72 which has an outwardly directed lip 74 and parallel flattened sides 76,78 (see FIGS. 4A and 4B). A poppet member 80 is mounted in the bore 54 with a conical sealing face 82 engaging the sealing face 70 and tip 84 projecting through bore 54 beyond shoulder 68 and flange 72. The poppet member 80 has an internal axial bore 86 and radial bores 88,90 allowing fluid flow when the sealing surfaces 64,82 are disengaged (see FIG. 1). Spring means 92, typically a helical or wave spring, is supported in the bore 54 by retainer 94 engaging internal threads 60 to bias the poppet member 80 to the position shown in FIG. 3. A cylindrical outer shell 96 is mounted on the mating end 58 of the main body 52 by means of internal threads 98 engaging external threads 70. The outer shell 96 has an axial cavity 100 profiled to receive therein the male coupler member 12 and shoulders 102,104 adapted to engage shoulders of the main body, preferably with O-rings 106 therebetween. An internal groove 108 receives therein a seal 110, preferably an axial helical spring actuated elastomeric seal. A metal sealing spring 112, preferably an E-shaped spring, is mounted on the flange 72. An outer support ring 114 has an inwardly directed annular flange 116 to engage the shoulder the main body 52 and to be held in place by means of the outer shell 96. The outer support ring 114 has outwardly directed threads 118 to engage in a mounting block or the like 120.

The metal seal 112 is installed onto the flange 72 by pulling on one side against the flange 72 allowing the retaining lip of the seal 112 to slide against the two parallel surfaces until the seal 112 rests under the circumferential lip 74. By this means a metal seal 112 with a slightly smaller diameter than the circumference of the flange 72 can be installed. FIG. 4 shows a detail of the seal and the flange.

The metal seal 112 is preferably E-shaped and the sealing forces are determined by the size and number of undulations in the seal. For example, a seal as shown with one complete undulation will have about 0.05" plastic and 0.02" elastic deformation while a seal three times the length of the seal shown would have about 0.015" plastic and 0.060" elastic deformation. The sealing forces and the elastic and plastic deformation, of course, would also be dependent upon the type, shape, and thickness of the material used.

During insertion of the male member 12 into the outer shell 96, the spring loaded poppet valve members 36,80 in the male and female members 12,14, respectively are mutually engaged allowing a small amount of fluid to escape into the cavity of the outer shell 96. Upon further insertion of the male member 12 into the outer shell 96, the seal 110 will engage the outer surface of the male member sealing off any fluid. Further insertion of the male member 12 into the outer shell 96 will engage with the metal face seal 112, typically an E-seal, and upon further engagement plastically and elastically deform the seal. The internal cavity pressure will urge the seal outwardly against the outer shell 96 and longitudinal against the main body 52 and the end of the male member providing a metal to metal primary seal.

When the two coupler members are unmated, the metal face seal will initially part from the end face of the male member while the poppet valve members are still engaged allowing fluid flow through the coupling. Upon completely parting of the two coupler members, the helical springs will act on the respective poppet valve in the male member and in the female member to close off the fluid flow.

Figure 5:
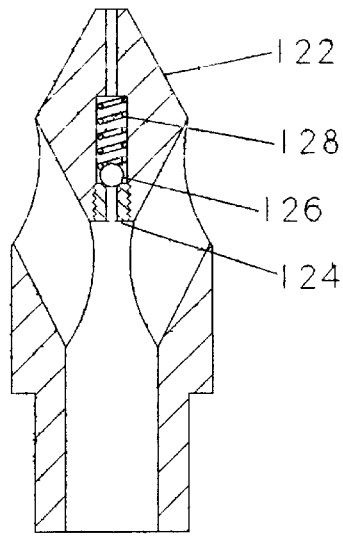
FIG. 5 is a longitudinal section through a poppet member provided with a pressure relief valve.

FIG. 5 is a longitudinal section through an embodiment of a poppet member provided with a pressure relief valve. The poppet body is provided with a profiled axial bore 122 closed at one end by valve seat insert 124. A valve ball 125 is biased against the seat by spring means 128.

Figure 6:
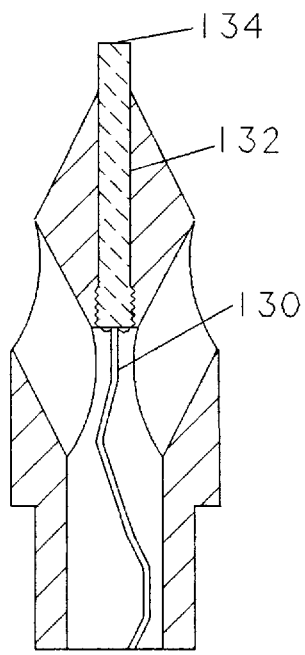
FIG. 6 is a longitudinal section through an alternate embodiment of a female poppet member for an electrical connector application.
Figure 7:
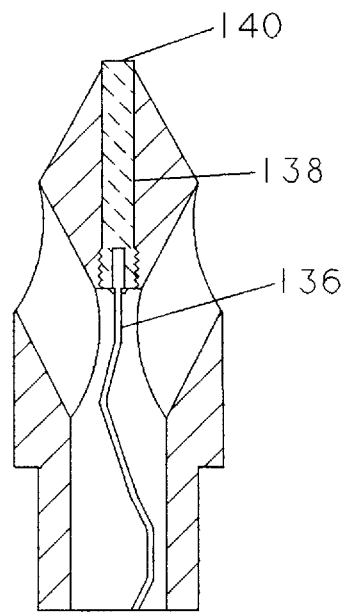
FIG. 7 is a longitudinal section through an alternate embodiment of a male poppet member for an electrical connector application.

FIGS. 6 and 7 are longitudinal sections through alternate embodiments of female and male, respectively, poppet members for use an electrical connector application. Electrical conductors 130, 136 are connected to electrical terminals 132, 138, respectively, each of which has a tip 134, 140 extending beyond the mating end of the respective poppet member. At least these tip portions are plated with a protective layer, such as gold. For electrical connector applications, only a non dielectric fluid can be passed through the coupling and the mutually engaging poppet members are made of non dielectric material.

Figure 8:
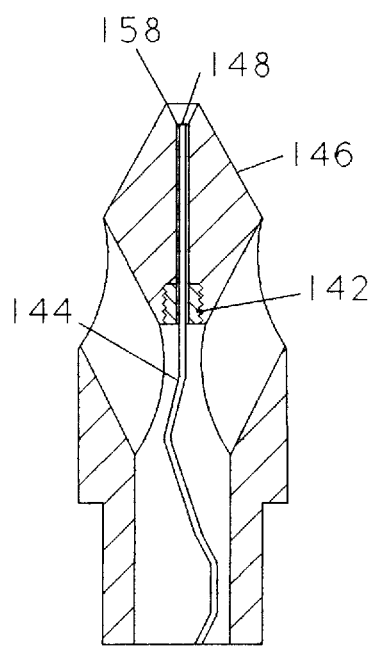
FIG. 8 is a longitudinal section through a further alternate embodiment of a male poppet member for a fiber optic connector application.
Figure 9:
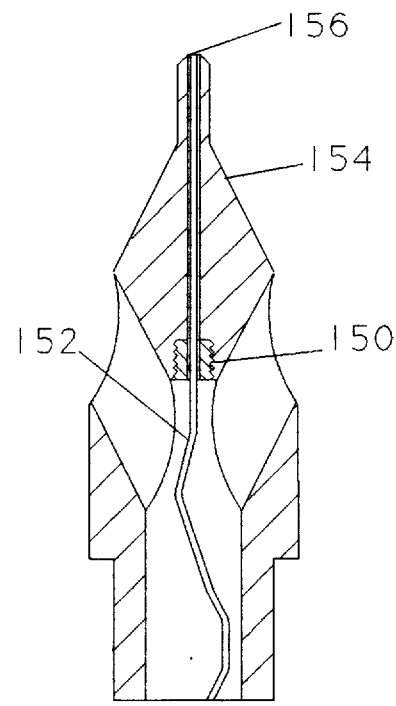
FIG. 9 is a longitudinal section through a further alternate embodiment of a female poppet member for a fiber optic connector application.

FIGS. 8 and 9 are longitudinal sections through further alternate embodiments of male and female poppet members for a fiber optic connector application. Each poppet member 146,154 is provided with axially mounted fiber optic connectors 142, 152, respectively, mounted on the end of an optical fiber cable 144,152. The ends 148,156 of the fiber optic connectors are profiled to axially align the optical fibers in a mated condition.

Figure 10:
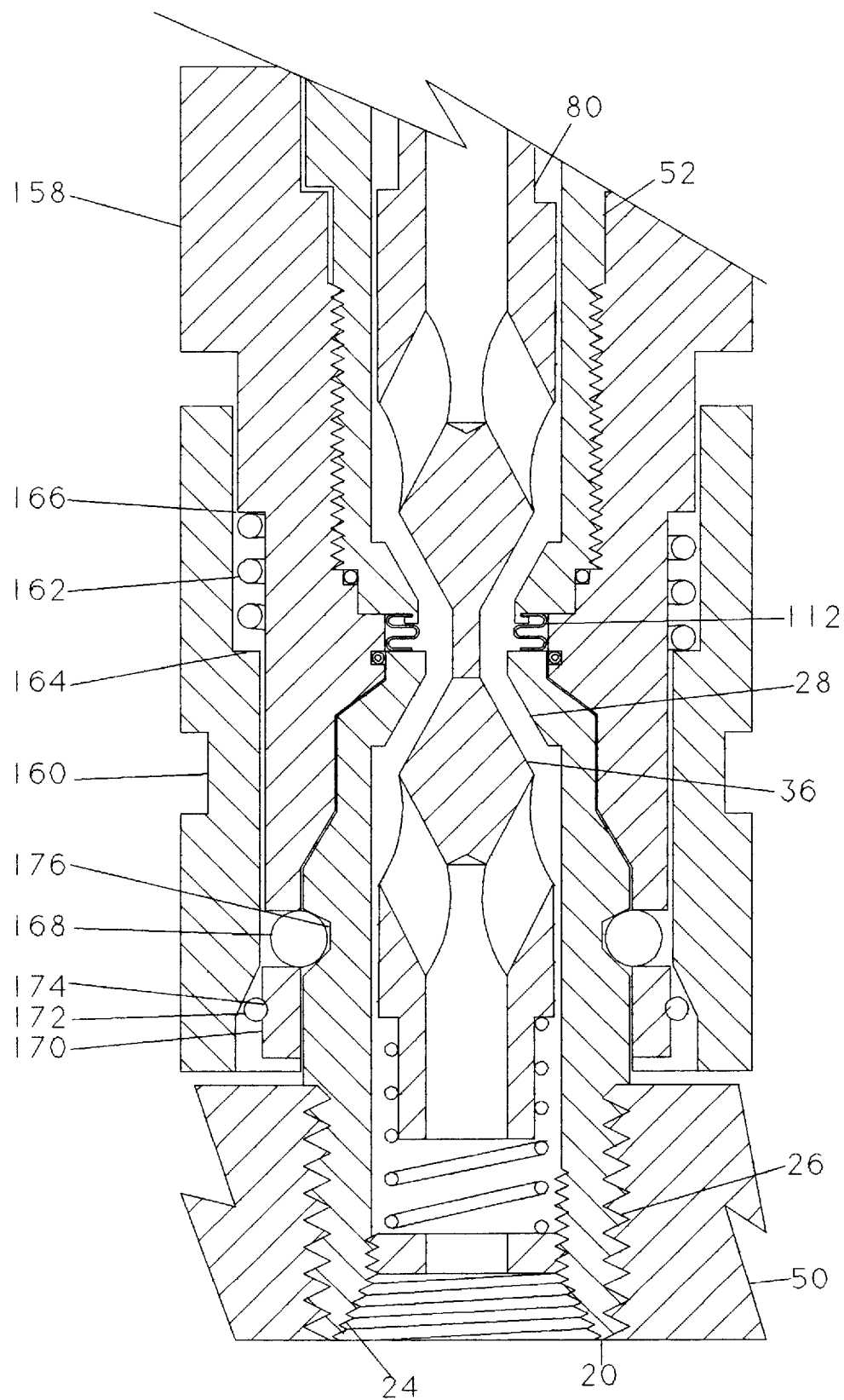
FIG. 10 is a longitudinal section through portions of an alternate embodiment of the subject coupler showing a latching assembly for securing the coupler, when used as an individual coupling, in a mated condition.

FIG. 10 shows an example of means to latch the coupler members together in a mated condition. A modified outer shell 158 has an annular ring member 160 mounted thereon. An outwardly directed shoulder 162 is formed on the outer shell and an opposed inwardly directed shoulder 164 is formed on the ring member with a biasing spring 166 mounted therebetween. A plurality of balls 168 and mounted in a like number of profiled bores 170 uniformly spaced around the outer shell to engage in recesses 176 in the main body. Retainer split rings 172 are received in recesses 174 and pin 178 is received in profiled groove 180 to restrain the relative movement of the ring member on the outer shell.

Other known latching means, such as a simple screw threaded engaging members, can also be used. Latching means (not shown) can also be incorporated into the members mounting the couplers.

The present invention may be subject to many modifications and changes without departing from the spirit or essential characteristics thereof. This present embodiment is therefore intended to be, in all aspects, illustrative and not restrictive of the scope of the present invention ad defined by the appended claims.

I claim:

1. A coupling, comprising:

mating male and female coupling members;

said female member having a first body with an axial bore extending between mounting and mating ends, said bore having an internal profile defining a sealing surface, a first poppet valve member including check valve means movably mounted in said bore and having a sealing surface adapted to mate with the sealing surface of said first body, means biasing said first poppet valve member into engagement of said sealing surfaces, an outer shell attached to the first body forming an entry cylinder around said mating face, and a support ring mounted on said first body and adapted to secure said female coupling member to mounting means: and said male member having a second body with an axial bore extending between mounting and mating ends, said bore having an internal profile defining a sealing surface, a second poppet valve member including second check valve means movably mounted in said bore and having a sealing surface adapted to mate with the sealing surface of said second body, means biasing said second poppet valve member into engagement of said sealing surfaces, said second body having an outer profile adapted to be inserted into said outer shell such that said poppet valve members are moved to open positions; and dynamic metal face seal means having high deflection and spring back capability mounted on the mating end of said first body, said seal means supported on its outer diameter by the outer shell to provide a seal for fluids passing between said bores upon engagement of said coupling members.

2. A coupling assembly for fluid systems, such as hydraulic lines and the like, comprising:

a female coupling member having a cylindrical first body with mating and mounting ends, a profiled outer surface, and a longitudinal bore extending between said ends with inwardly directed sealing surface between said first and second ends, a poppet member mounted in said bore with a sealing surface of said member engagable with the sealing surface of said first body, means biasing said member to engage said sealing surfaces, and seal mounting means on said mating end, an annular flange on the mating end of said first body, said flange having two parallel flats enabling a metal ring seal with a smaller diameter than said flange to be mounted thereon, said flange having an outwardly threaded lip on the free edge thereof retaining said metal ring seal thereon;

a cylindrical outer shell having first and second ends with said first end adapted to be attached to the profiled outer surface of said first body, and an internal cylindrical bore with a circumferential groove therein adapted to received therein sealing means, and said second end having a large cylindrical bore forming an entrance;

a male coupling member having a cylindrical probe with mating and attachment ends, a longitudinal bore extending between said ends with inwardly directed sealing surface between said first and second ends, a poppet member mounted in said bore with a sealing surface of said member engagable with the sealing surface of said probe, means biasing said member to engage said sealing surfaces, and said probe having an outer profile adapted to be inserted into said cylindrical bore of said outer shell; and a dynamic metal ring seal mounted on the mating end of said main body forming a metal face seal between the main body and the cylindrical probe in a coupled condition.

3. The coupling of claim 2, wherein said sealing means in said outer shell is an elastomeric seal actuated by an axial helical spring.

4. The coupling of claim 2, further comprising:

a support ring adapted to attach the female coupling member to a support structure, an outer circumferential shoulder on said first body, and an inner circumferential shoulder on said support ring, said support ring allowing relative and predefined lateral movement when indexing said probe into said female coupler and, upon mating, allow transfer of longitudinal forces caused by cavity pressure in the annulus between said main body and said probe through said outer circumferential shoulder of said main body and said inner circumferential shoulder of said support ring.

5. A coupling, comprising:

mating male and female members each having a body member with an axial bore extending between mating and mounting ends with a sealing surface in said bore between said ends, a poppet valve member comprising check valve means in each said bore with a sealing surface, spring means biasing said poppet valve members into engagement of said sealing surfaces;

a metal face seal with high deflection and spring back capability mounted on the mating end of said female body member;

an outer shell mounted on the body member of said female member and having a longitudinal bore for receiving said male member therein and providing circumferential support for said metal face seal;

a support ring adapted to attach the female coupler member to a support structure allowing a relative and predefined lateral movement between said female member and said support ring when mating said coupler members.

6. The coupling according to claim 5 wherein said metal face seal is a ring with an E-shaped section whereby the plastic and elastic deformation and spring back capability of said seal is controlled by the number of undulations forming said E-shape.

7. The coupling according to claim 6 wherein the number of undulations in said E-shaped seal is in the range of up to 5.

8. The coupling according to claim 6 wherein sealing forces are determine by the size and shape of the undulations in said seal.

9. A coupling according to claim 5 wherein, upon mating, said poppet valve members release a predefined volume of fluid flushing a cavity formed between the probe, main body and outer shell prior to said elastomeric seal sealing said annular cavity.

10. A coupling according to claim 5, in which said check valve in said probe has a reversing fluid relief means to prevent hydraulic lock of hydraulic cylinders for applications when the coupling is used in hydraulic systems.

11. The coupling according to claim 5 further comprising electrical contact means carried by each said poppet valve member and providing electrical contact in the mated condition of said members.

12. A coupling according to claim 5, in which the mutually engaging poppet valve members is of non dielectric material.

13. The coupling according to claim 5 further comprising fiber optic coupling means carried by each said poppet valve member and providing optical coupling in the mated condition of said members.

14. The coupling of claim 5, wherein said metal seal is pressure energized by internal cavity pressure and urged radially outwardly against said outer shell and longitudinally against the mating end of said main body and the mating end of the inserted probe to engage in a metal to metal sealing relationship.

15. A coupling, comprising:

an outer shell having a longitudinal bore for receiving a probe and a axial recess therein and an axial elastomeric seal received in said recess;

a main body having mating and mounting ends with an axial through bore extending between said ends and having a poppet valve therein biased to normally sealingly close said bore, said poppet valve including check valve means, and a E-shaped metal ring seal mounted on the mating end of said main body to be retained and seal inside a circumferential groove;

a probe having an axial through bore with a second poppet valve therein biased to normally sealing close said bore, said second poppet valve including a second check valve means, said probe adapted to be inserted into the outer shell to engage and open said poppet members;

a metal ring seal having an E-shaped section providing high deflection and spring back capability; and a support ring attaching the female coupler to related support structure allowing a relative and predefined lateral movement between said coupler and said support ring when indexing said probe into said female coupler.

16. A coupling according to claim 15 further comprising an elastomeric secondary sealing member energized by a helical spring providing a primary seal for pressure during inserting said probe into said outer shell and when parting said probe from said outer shell by exposing said elastomeric seal to the fill differential pressure between said internal cavity and external environment preventing said primary circumferential metal face seal with high deflection and spring back capability from such pressure shocks while inserting into or parting said probe from said outer shell.

17. A coupling according to claim 16 in which said helical spring energized elastomeric secondary seal functions environmentally seal said primary metal face seal when said metal face seal is engaged and pressure energized by internal cavity pressure.

* * * * *